United States Patent [19]

Volz

[11] Patent Number: 5,095,702
[45] Date of Patent: Mar. 17, 1992

[54] MASTER CYLINDER FOR AN ANTI-LOCKING HYDRAULIC BRAKE SYSTEM

[75] Inventor: Peter Volz, Darmstadt, Fed. Rep. of Germany

[73] Assignee: Alfred Teves GmbH, Frankfurt am Main, Fed. Rep. of Germany

[21] Appl. No.: 531,957

[22] Filed: Jun. 1, 1990

[30] Foreign Application Priority Data

Jun. 9, 1989 [DE] Fed. Rep. of Germany ....... 3918909

[51] Int. Cl.[5] ............................................. B60T 17/22
[52] U.S. Cl. ................................. 60/534; 60/545; 92/165 R; 91/1
[58] Field of Search ............... 60/534, 535, 538, 545, 60/582; 92/5 R, 165 R; 91/1

[56] References Cited

U.S. PATENT DOCUMENTS

| 3,159,974 | 12/1964 | Rodgers | 60/562 |
|---|---|---|---|
| 3,423,940 | 1/1969 | Brand | 60/562 |
| 4,534,171 | 8/1985 | Leiber | 60/562 X |
| 4,785,615 | 11/1988 | Leigh-Monstevens | 60/534 |
| 4,885,910 | 12/1989 | Resch | 60/562 |
| 4,911,276 | 3/1990 | Leigh-Monstevens et al. | 92/5 R X |
| 4,914,916 | 4/1990 | Leigh-Monstevens et al. | 60/534 |
| 4,922,120 | 5/1990 | Becker et al. | 60/562 X |

FOREIGN PATENT DOCUMENTS

| 161651 | 9/1983 | Japan | 60/562 |
|---|---|---|---|
| 630147 | 5/1982 | Switzerland | 92/5 R |
| 1273300 | 5/1972 | United Kingdom . | |
| 2136899 | 9/1984 | United Kingdom . | |
| 2197402 | 5/1988 | United Kingdom . | |

Primary Examiner—Edward K. Look
Assistant Examiner—F. Daniel Lopez
Attorney, Agent, or Firm—Robert P. Seitter; J. Gordon Lewis

[57] ABSTRACT

Predetermined types of anti-locking brake systems equipped with a master cylinder and a pump, for controlling the pump, requiring sensors for detecting the position of the master piston within the longitudinal bore 7 of the master cylinder housing 1. Way sensors or way switches are provided for this purpose. The present invention provides a simple arrangement of this type of sensor comprising a reed contact 18 and an annular magnet 20, with the reed contact 18 being cast into a stationary sealing plug 13 of the master cylinder while the annular magnet 20 is inserted into a recess 21 within an extension 9 of the master piston 6 for movement with the master piston.

21 Claims, 1 Drawing Sheet

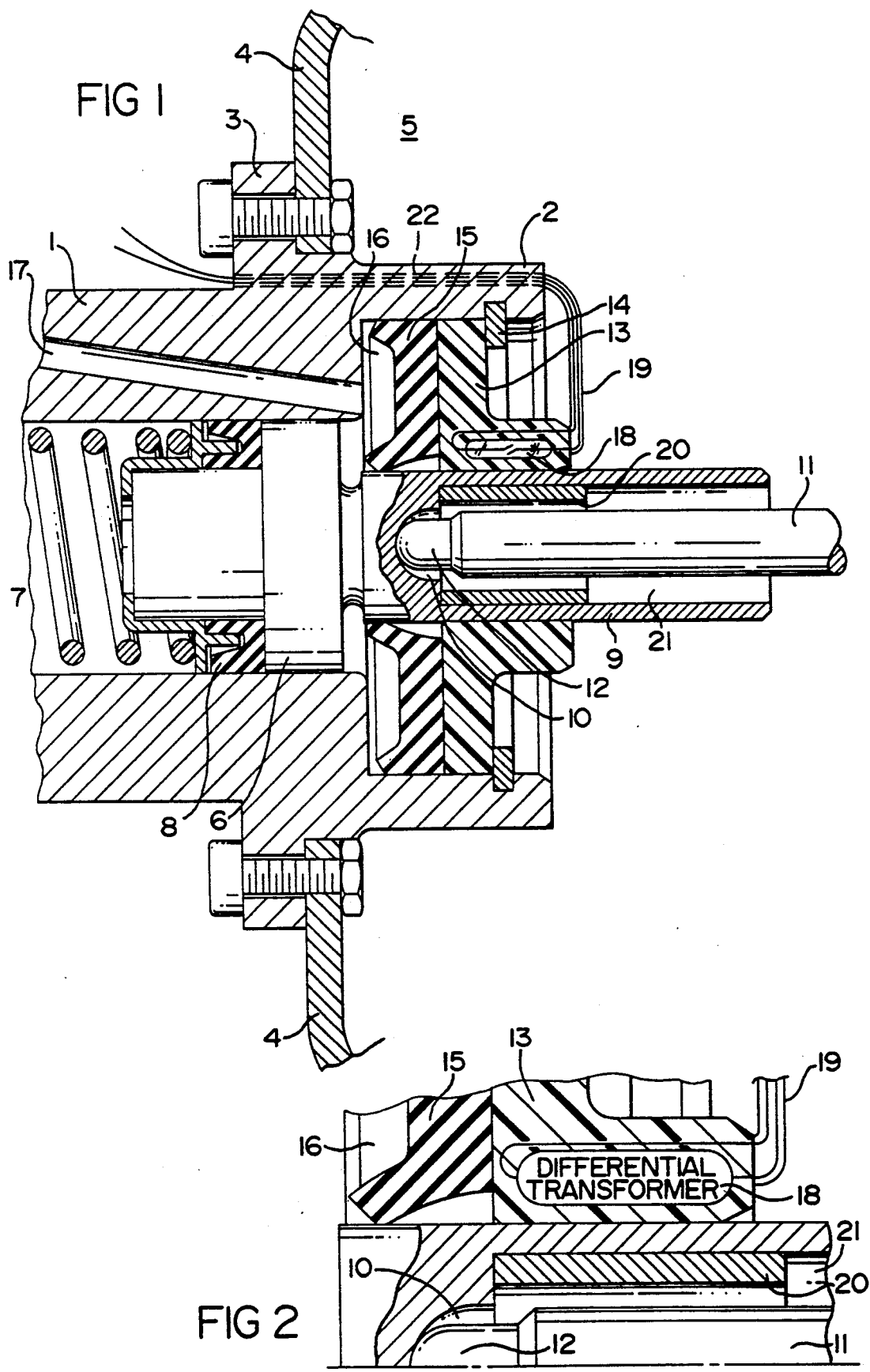

MASTER CYLINDER FOR AN ANTI-LOCKING HYDRAULIC BRAKE SYSTEM

BACKGROUND OF THE INVENTION

1. Field of the Invention

The present invention is directed to a master cylinder, particularly for an anti-locking hydraulic brake system comprising means for determining the position of the master piston within the longitudinal bore of the master cylinder housing.

2. Description of the Related Art

A brake system including a master cylinder of the general type described above is disclosed in German Specification DE-OS 37 51 603. The master cylinder, through a brake conduit, is in communication with a wheel brake. The brake conduit can be blocked by means of an inlet valve. The wheel brake, through a by-pass provided by an outlet valve, is in communication with a reservoir. A pump delivers fluid from the reservoir into the working chamber of the master cylinder. During deceleration, the rotating pattern of the wheel is permanently monitored to immediately detect if a wheel tends to lock. Upon detection of a locking condition, the pump drive is actuated to cause the pump to deliver fluid into the master cylinder. By opening and closing the inlet and outlet valves, the pressure in the wheel brake can be so modulated that the brake torque attains a value corresponding to the friction between tire and road. The pressure fluid delivered by the pump into the working chamber of the master cylinder forces the master piston back into its initial position. To prevent the piston from being completely returned, it has previously been suggested that the position of the master piston be determined and the pump delivery be regulated in response to the determined position of the master piston. According to greater detail in the aforementioned German Specification, it is insured that the master piston, during a brake slip control, assumes a position in advance of its initial position.

The means for determining the position of the master piston, according to the German Specification, may comprise, for example, a plunger actuating a switch and being excited by a ramp on the master piston. According to another embodiment in which the master cylinder is actuated by a vacuum brake force booster, a switch is positioned in the housing wall of the brake force booster, and the switch is actuated by the booster wall.

Both of the above proposed solutions disadvantageously require special structures for the master cylinder or for the vacuum brake force booster. Moreover, there is a high possibility of malfunction because the proposed corrective means do not work in a contact-free manner with the consequence that substantial adjustment efforts are needed to insure precise positioning of the master piston during a brake slip control.

SUMMARY OF THE INVENTION

The present invention is directed therefor to providing a system for determining the position of the master piston which reduces the possibility of system malfunction, which is easy to assemble and to adjust, and which is capable of being readily mounted into existing assemblies.

The means for determining the position of the master piston in accordance with the present invention operates in a contact-free manner, and includes a receiver preferably comprising a reed-contact and a transmitter comprising a magnet. However, other types of sensors can be employed, such as magnet-sensitive or inductive sensors. It is also possible to employ differential transformers consisting of a flat metallic glass rod with a transmitter coil mounted thereon, and of two receiver coils.

The receiver is located in a sealing plastic plug of the master cylinder, and there is no need to reconstruct the entire master cylinder, but rather only the portion holding the receiver part. It is therefore possible to employ a standard type of master cylinder, thereby enabling a conventional brake system to be retooled. The transmitter comprised of magnet sensitive sensors is a magnet which can be readily inserted into a recess of an extension of the master piston which accommodates the push rod for transmitting the pedal forces to the master piston. Accordingly the improvement of the present invention may readily be adopted into existing conventional braking systems.

BRIEF DESCRIPTION OF THE DRAWING

Drawing FIG. 1 illustrates in cross section, the preferred embodiment of an improved master cylinder in accordance with the present invention.

Drawing FIG. 2 illustrates in broken cross section, an alternative embodiment of an improved master cylinder in accordance with the present invention.

DESCRIPTION OF THE PREFERRED EMBODIMENT

Drawing FIG. 1 illustrates a sectional view of a preferred embodiment of a master cylinder comprising a master cylinder housing 1 provided with a longitudinal bore 7. The housing 1 defines a sleeve type extension 2 extending concentrically around a longitudinal axis of the bore 7. The master cylinder housing is provided with a flange 3 by which it can be screwed to the housing 4 of a vacuum brake force booster, with the sleeve type extension 2 of the master cylinder housing extending a vacuum chamber 5 of the vacuum brake force booster. A master piston 6 is sealingly guided within the longitudinal bore 7 of the master cylinder housing 1.

The sealing effect is attained by sealing collars 8 provided on the master piston 6. The master piston 6 includes a cup shaped extension 9 extending in the axial direction of the master piston and extending beyond the master cylinder housing 1. The extension 9 defines a recess 21 which forms a trough 10 on its bottom which supports a push rod 11 through a plug 12. The push rod 11 transmits the pedal forces and the servo force of the brake force booster, respectively, and the extension 9 is movable with the master piston and the push rod. The extension 9 extends through a plug 13 sealing the opening of the sleeve type extension 2 in the vacuum chamber 5. The plug 13 is held by a ring 14 provided in the internal wall of the extension 2. The plug 13 defines, within the master cylinder housing 1 and within the sleeve type extension 2, respectively, an intake chamber 16 which, through a housing passageway 17, is in communication with a pressure fluid reservoir (not shown). Sealing of the intake chamber 16 is accomplished by a sealing collar 15 arranged in abutment with the plug 13 and with a sealing lip embracing the extension 9.

Plug 13 is formed as a ring having a cross section in an L-shaped configuration. A first leg of the plug 13 extends between the extension 9 and the sleeve type extension 2, while another leg of the plug 13 is parallel to the extension 9. A reed contact 18 which, through an electric cable is in communication with an analyzer (not shown) is received within the parallel leg of the plug 13. The cable 19, through a bore 22 sealed in an air-tight manner, is guided from the area of the vacuum chamber 5 ahead of flange 3.

Means for actuating the reed contact 18 is an annular magnet 20 inserted into the recess 21 of the extension 9 enclosing the push rod 11. Since the magnet 20 completely enclosed the push rod 11, irrespective of any rotation of the master piston, a portion of the magnet 20 is in the vicinity of the reed contact 18. Adjustment of the sensors can, therefore, be effected by simple means as the magnet 20 is held within the recess 21 in a manner by which it is movable within the recess but may be fixed in a desired position within the recess for movement with the extension 9. It is possible to provide a plurality of reed contacts in axial series arrangement to enable detection of several different positions of the master cylinder piston, if required.

The master cylinder of the present invention operates in the following manner. When applying the brake, the master piston is displaced, as shown, to the left. In the pressure chamber to the left of the master piston 6, a pressure is generated which is passed to the wheel brakes. During displacement of the master piston 6, the magnet 20 is also moved to a position to the left of the reed contact 18, since the magnet is movable together with the extension 9 of the master piston 6.

With an excessive pressure prevailing in the wheel brake, the appertaining wheel tends to lock, in which case the system switches to the anti-locking mode. This means, as generally described in greater detail by the aforementioned prior art, that a pump forming part of the brake system delivers pressure fluid to the pressure chamber ahead of the master piston 6, with the result that the master piston 6 is moved to the right such that the magnet 20 is moved to the sensor area of the reed contact 18, causing the reed contact to close. An electronic analyzer records the short circuit in the circuit forming part of the reed contact, interrupting the pressure fluid delivery of the pump. This causes the master piston to remain in the position in which the reed contact switches closed for the first time. In the course of the control mode, pressure fluid is withdrawn from the master cylinder thereby causing the master piston to travel to the left. The magnet 20 is removed from the sensor area of the reed contact 18, thereby causing the reed contact 18 and the corresponding circuit to open, and causing the electronic analyzer to initiate a renewed pressure fluid delivery. It is thereby assured that, firstly, adequate pressure fluid is available for the control of the brake pressure and, secondly, that the master piston 6 and, hence, the brake pedal, is displaced into a predetermined defined position.

As shown in FIG. 1, the sensor comprising the reed contact 18 and the magnet 20, does not require any substantial mounting space. Moreover, assembly is extremely easy as the plug 13 can be preassembled with the reed contact 18. The magnet 20 is readily insertable into the recess 21. No substantial structural modifications to the master cylinder housing 1 or housing 4 of the vacuum brake force booster of a conventional master cylinder will be required to incorporate the improvement of the present invention. The sensor is integrated into the master brake cylinder thereby eliminating the need for providing any additional switches on the pedal. In the event that other types of sensors are used, such as differential transformers, the design concept is the same in which the current conducting part which generally is the receiver, comprises the stationary element of the sensor.

What is claimed is:

1. A master cylinder for an anti-locking hydraulic brake system, comprising means for determining the position of a master piston within a longitudinal bore of a master cylinder housing, an open end of the master cylinder housing being sealed by a plug through which an axial extension of the master piston is sealingly movable, characterized in that the means for determining the position of the master piston includes a sensor having a transmitter and a receiver, the transmitter being located within the extension of the master piston and the receiver being provided within the plug.

2. A master cylinder as set forth in claim 1, characterized in that the sensor is a differential transformer.

3. A master cylinder as set forth in claim 1, characterized in that the plug is of an annular configuration and is L-shaped in cross section, said L-shaped cross section defining one leg extending axially along the extension, the receiver being provided within said axially extending leg.

4. A master cylinder as set forth in claim 3, characterized in that the plug is made of plastic material.

5. A master cylinder as set forth in claim 4, characterized in that the receiver is cast into the plug.

6. A master cylinder as set forth in claim 1, characterized in that the receiver is a switch for generating a signal, said switch signal being transmitted through conduits which are guided through a passageway within the master cylinder housing ahead of a securing flange.

7. A master cylinder as set forth in claim 6, characterized in that the passageway is sealed in an air-tight manner.

8. A master cylinder as set forth in claim 1, characterized in that the extension of the master piston defines a longitudinal recess for acommodating a push rod, and that the transmitter is received in the recess.

9. A master cylinder as set forth in claim 8, characterized in that the receiver is a reed contact.

10. A master cylinder as set forth in claim 9, characterized in that the transmitter is an annular magnet which is in abutment with an internal wall of the recess encloses the push rod.

11. In a master cylinder for an anti-locking hydraulic brake system comprising means for determining the position of a master piston within a longitudinal bore of a master cylinder housing, an open end of said master cylinder housing being sealed with a plug through which an axial extension of the master piston is sealingly guided, the improvement comprising:
said means for determining the position of said master piston including at least one sensor, said sensor comprising two elements, one of said elements being a receiver and the other of said elements being a transmitter, one of said elements being mounted for conjoint movement with said master piston relative to said master cylinder housing and the other of said elements being mounted to said plug, stationary relative to said master cylinder.

12. The master cylinder as set forth in claim 11 wherein said receiver is mounted stationary relative to said master cylinder.

13. The master cylinder as set forth in claim 12 wherein said receiver is a magnetically actuated switch.

14. The master cylinder as set forth in claim 12 wherein said receiver is cast in said plug.

15. The master cylinder as set forth in claim 11 wherein said transmitter is mounted for conjoint movement with said master piston.

16. The master cylinder as set forth in claim 15 wherein said transmitter is a magnet.

17. The master cylinder as set forth in claim 15 wherein said transmitter is mounted within said axial extension of said master piston.

18. The master cylinder as set forth in claim 17 further including a push rod received within said axial extension of said master piston, said transmitter being an annular magnet surrounding said push rod.

19. The master cylinder as set forth in claim 11 wherein one of said two elements of said sensor is a switch, and the other of said two elements of said sensor is a switch actuator, said switch being coupled to means for switching into an anti-locking brake mode.

20. In a master cylinder for an anti-locking hydraulic brake system comprising means for determining the position of a master piston within a master cylinder housing, said master cylinder housing being sealed by a plug at one end thereto, said master piston including an axial extension defining a bore which is movable through said plug, the improvement comprising:

said means for determining the position of said master piston including a sensor having a transmitter and a receiver, said transmitter being mounted within said bore defined by said axial extension for movement with said master piston, said receiver being mounted on said plug and being stationary relative to said master cylinder, said transmitter being adapted to actuate said receiver when said transmitter is moved within a predetermined range of said receiver.

21. The master cylinder as set forth in claim 20 wherein said transmitter is a magnet and said receiver is a magnetically activated switch.

* * * * *